(12) United States Patent
Nakanishi et al.

(10) Patent No.: US 11,932,293 B2
(45) Date of Patent: Mar. 19, 2024

(54) CAR MONITORING SYSTEM

(71) Applicant: KAWASAKI RAILCAR MANUFACTURING CO., LTD., Kobe (JP)

(72) Inventors: Koichi Nakanishi, Kobe (JP); Yuta Sakurai, Kobe (JP); Shuhei Matsumoto, Hartsdale, NY (US)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 694 days.

(21) Appl. No.: 16/764,108

(22) PCT Filed: Nov. 14, 2017

(86) PCT No.: PCT/JP2017/040853
§ 371 (c)(1),
(2) Date: May 14, 2020

(87) PCT Pub. No.: WO2019/097563
PCT Pub. Date: May 23, 2019

(65) Prior Publication Data
US 2020/0276994 A1    Sep. 3, 2020

(51) Int. Cl.
*B61L 15/00* (2006.01)
(52) U.S. Cl.
CPC ....... *B61L 15/0072* (2013.01); *B61L 15/0009* (2013.01); *B61L 15/0018* (2013.01); *B61L 15/0081* (2013.01)
(58) Field of Classification Search
CPC .. B61L 15/00; B61L 15/0009; B61L 15/0018; B61L 15/0054; B61L 15/0063;
(Continued)

(56) References Cited

U.S. PATENT DOCUMENTS

| | | | |
|---|---|---|---|
| 2004/0199552 A1* | 10/2004 | Ward | G06F 16/275 |
| 2014/0059534 A1* | 2/2014 | Daum | G06F 8/65 |
| | | | 717/172 |
| 2018/0022368 A1* | 1/2018 | Tatsumi | B61L 15/009 |
| | | | 701/19 |

FOREIGN PATENT DOCUMENTS

| | | |
|---|---|---|
| EP | 0832779 A2 | 4/1998 |
| JP | 2004-033000 A | 1/2004 |

(Continued)

*Primary Examiner* — Russell Frejd
*Assistant Examiner* — Sara J Lewandroski
(74) *Attorney, Agent, or Firm* — Oliff PLC

(57) ABSTRACT

A car monitoring system includes: a sub-system to execute a predetermined function by controlling at least one instrument mounted on a railcar; and a monitoring device to monitor an operating state of the sub-system. The sub-system includes: a sub-system controller to create status data containing pieces of event information based on a signal output from the instrument and periodically transmit the status data to the monitoring device, the information informing the monitoring device of a change in state of the instrument; and a first memory to store a first event parameter file defines a data structure of an event region of the status data, the event region being a region wherein the information are stored. When the first parameter file is changed, and the sub-system controller creates the status data, the controller reconstructs the data structure of the region and resets the information in accordance with the reconstructed data structure.

13 Claims, 14 Drawing Sheets

(58) Field of Classification Search
CPC ............. B61L 15/0072; B61L 15/0081; B61L 15/009; G06F 8/60; G06F 8/65; G06F 8/656; G06F 8/70; G06F 8/71; G06F 21/57; G06F 2205/003; G06F 2205/063; G06F 3/0629; G06F 3/0638; G06F 3/064; G06F 3/0643; G06F 3/0653; G06F 40/194; G05B 2219/31101; G05B 2219/32019

See application file for complete search history.

(56) References Cited

FOREIGN PATENT DOCUMENTS

| | | |
|---|---|---|
| JP | 2011-205777 A | 10/2011 |
| WO | 2016/170582 A1 | 10/2016 |

\* cited by examiner

| Code | Name | Description | Attributes | ... |
|---|---|---|---|---|
| ABC-0001 | Event A | ... | ... | ... |
| ABC-0002 | Event B | ... | ... | ... |
| ABC-0003 | Event C | ... | ... | ... |
| ABC-0004 | Event D | ... | ... | ... |
| ABC-0005 | Event E | ... | ... | ... |
| ... | ... | ... | ... | ... |

FIG.3

| Code | Name | Size | Byte | Bit | CONVERSION COEFFICIENT | ... |
|---|---|---|---|---|---|---|
| ABC-0001 | Signal A | 1 bit | 1 | 7 | 2states/bit | ... |
| ABC-0002 | Signal B | 2 bit | 1 | 6 | 4states/bit | ... |
| ABC-0003 | Signal C | 1 byte | 50 | Null | 1A/bit | ... |
| ABC-0004 | Signal D | 2 bytes | 51 | Null | 0.1Hz/bit | ... |
| ABC-0005 | Signal E | 1 bit | 1 | 4 | 2states/bit | ... |
| ... | | | | | | ... |

FIG.12

|  | 7bit | 6bit | 5bit | 4bit | 3bit | 2bit | 1bit | 0bit |
|---|---|---|---|---|---|---|---|---|
| 1byte | A | B | B | E | ... | ... | ... | ... |
| 2bytes | ... | ... | ... | ... | ... | ... | ... | ... |
| ... | ... | ... | ... | ... | ... | ... | ... | ... |
| 50bytes | C | C | C | C | C | C | C | C |
| 51bytes | D | D | D | D | D | D | D | D |
| 52bytes | D | D | D | D | D | D | D | D |
| ... | ... | ... | ... | ... | ... | ... | ... | ... |

CAR MONITORING SYSTEM

TECHNICAL FIELD

The present invention relates to a car monitoring system configured to monitor states of sub-systems provided at a car.

BACKGROUND ART

A railcar (hereinafter referred to as a "car") includes a monitoring device configured to provide operating states of various instruments provided at the car (see PTL 1, for example). A car network system described in PTL 1 includes: a plurality of terminal devices (instruments) mounted on the car; and a car network controller (monitoring device) to which the plurality of terminal devices are connected. The car network system controls the car network controller such that the car network controller monitors the terminal devices.

Examples of various instruments include inverters, brakes, doors, air conditioners, motors, automatic train operation devices (Automatic Train Operation, ATO), auxiliary power supply devices (Static Inverter, SIV), and automatic announcement systems. Further, a system configured to realize a predetermined function by controlling at least one instrument mounted on a car is called a sub-system. Specifically, examples of the sub-system include: a system configured to realize the function of controlling a motor to make the car travel; a system configured to realize the function of controlling a brake to make the car stop; and a system configured to control a motor to make a door open or close. The monitoring device can also be regarded as a device configured to monitor operating states of the sub-systems. It should be noted that the monitoring device is also called a central diagnosis device (Central Diagnostic System, CDS) or a train information management device.

To realize the above function, each sub-system includes a sub-system controller. Further, the monitoring device includes a monitoring device controller configured to control various operations of various instruments included in the monitoring device. The sub-system controllers included in the sub-systems and the monitoring device controller included in the monitoring device are connected to each other so as to be communicable with each other and are configured to be able to transmit and receive data to and from each other through a transmission line. For example, status data (SD) indicating the operating state of the sub-system is periodically transmitted from the sub-system to the monitoring device. When the monitoring device receives the status data from the sub-system, for example, the monitoring device judges an operating status of the sub-system based on the status data, or the monitoring device converts the status data into a format recognizable by humans and displays the status data on a display device (not shown) connected to the monitoring device.

A data structure of the status data is defined based on an ICD (Interface Control Document) that is agreed between a designer of the sub-systems and a designer of the monitoring device. The ICD is being kept by both the designer of the sub-systems and the designer of the monitoring device. It should be noted that the ICD is a document for defining and managing an interface between the sub-systems and the monitoring device.

Therefore, for example, when the status data is changed by adding or deleting information to or from the status data, the designer of the sub-systems and the designer of the monitoring device need to update the ICD. Further, to prevent the generation of inconsistency of the definition of the status data between the sub-systems and the monitoring device, software executed by the sub-system controllers and software executed by the monitoring device controller need to be updated at appropriate timing. It should be noted that the software is a program installed in each of the monitoring device controller and the sub-system controllers to interpret or set the status data. In the present description, the designer of the sub-systems and the designer of the monitoring device may be collectively called a designer of the car monitoring system.

CITATION LIST

Patent Literature

PTL 1: Japanese Laid-Open Patent Application Publication No. 2011-205777

SUMMARY OF INVENTION

Technical Problem

As described above, when the status data is changed, the software of the monitoring device and the software of the sub-systems need to be updated at appropriate timing. Therefore, updating the software in accordance with the change in the status data is work which needs to be done extremely carefully and requires time and labor. Especially, a relationship between the monitoring device and the sub-systems is a one-to-many relationship, and there is a problem that if the status data is frequently changed due to reasons related to the sub-systems, a burden on the designer of the monitoring device increases.

The present invention was made under these circumstances, and an object of the present invention is to provide a car monitoring system capable of preventing an increase in work burden on a designer of a car monitoring system when status data is changed.

Solution to Problem

A car monitoring system according to the present invention includes: a sub-system configured to execute a predetermined function by controlling at least one instrument mounted on a railcar; and a monitoring device configured to monitor an operating state of the sub-system. The sub-system includes: a sub-system controller configured to create status data containing pieces of event information based on a signal output from the instrument and periodically transmit the status data to the monitoring device, the pieces of event information informing the monitoring device of a change in state of the instrument; and a first memory configured to store a first event parameter file which defines a data structure of an event region of the status data, the event region being a region in which the pieces of event information are stored. When the first event parameter file is changed, and the sub-system controller creates the status data, the sub-system controller reconstructs the data structure of the event region based on the changed first event parameter file and resets the pieces of event information in accordance with the reconstructed data structure.

Advantageous Effects of Invention

As is clear from the above explanation, the car monitoring system according to the present invention has an effect of

BRIEF DESCRIPTION OF DRAWINGS

FIG. 3 is a diagram schematically showing one example of information contained in an event parameter file (EPF).

FIG. 12 is a table showing one example of contents of a SPF utilized in the car monitoring system according to Embodiment 2.

FIG. 13 is a diagram schematically showing one example of storage positions of pieces of signal information in a signal region of the status data utilized in the car monitoring system according to Embodiment 2.

DESCRIPTION OF EMBODIMENTS

Summary of Present Invention

Figure 1:
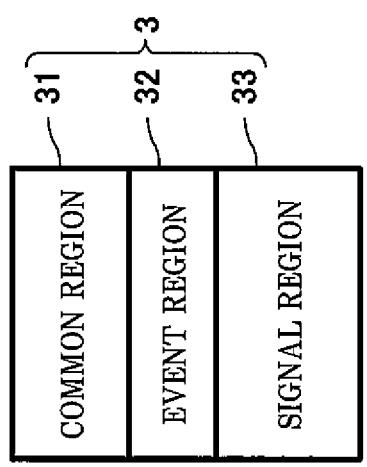
FIG. 1 is a schematic diagram showing one example of status data.
Figure 2:
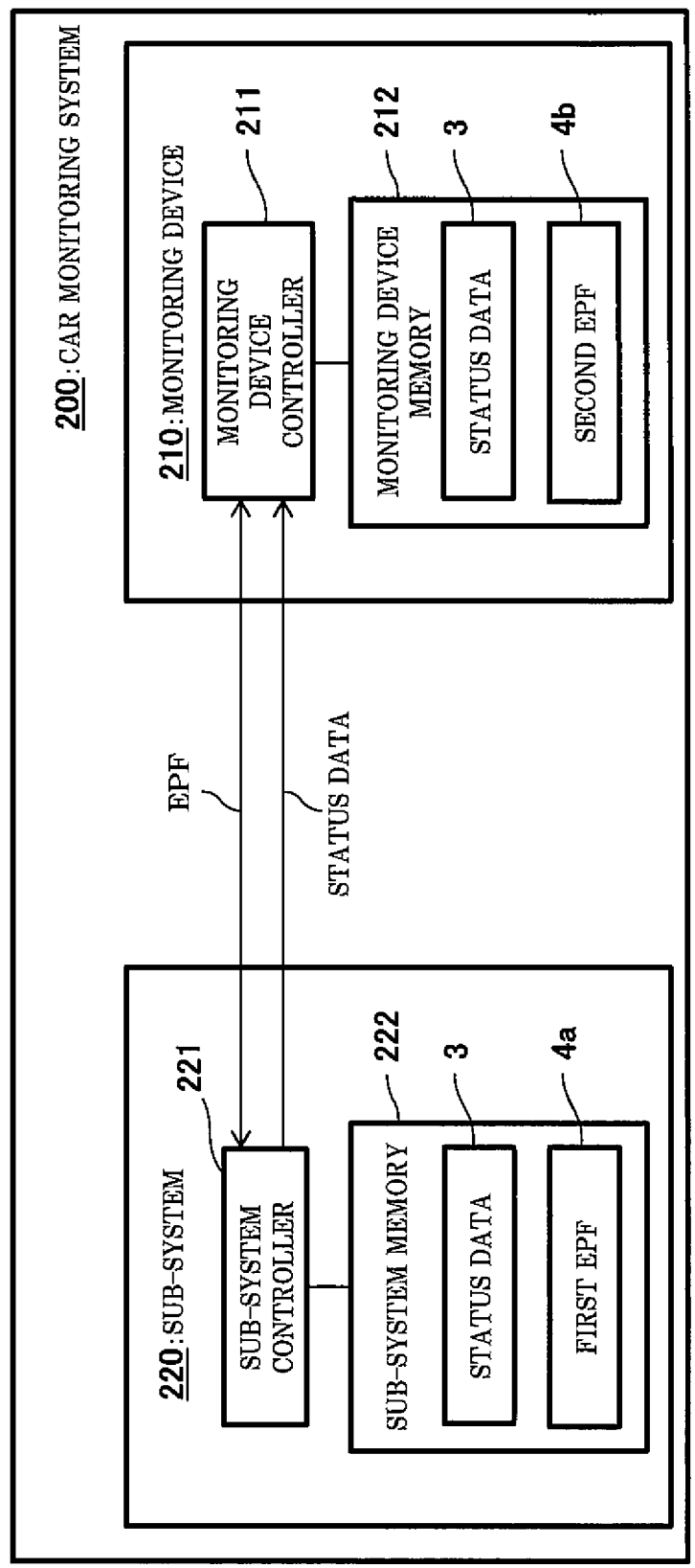
FIG. 2 is a block diagram schematically showing one example of a car monitoring system according to Comparative Example of the present invention.

Hereinafter, a summary of the present invention will be described with reference to FIGS. 1 to 3. FIG. 1 is a schematic diagram showing one example of status data 3. FIG. 2 is a block diagram schematically showing one example of a car monitoring system 200 according to Comparative Example of the present invention. FIG. 3 is a diagram schematically showing one example of information contained in an event parameter file (EPF).

First, in the car monitoring system 200, the status data 3 transmitted from each of sub-systems 220 to a monitoring device 210 at a fixed cycle contains data indicating an operating state of the sub-system 220. Specifically, as shown in FIG. 1, the status data 3 includes a common region 31, an event region 32, and a signal region 33. The common region 31 stores information (common information) commonly utilized among the sub-systems 220. The event region 32 stores event information which informs of the presence or absence of the generation of an event (a change in state of an instrument) in the sub-system 220. The signal region 33 stores signal information that is information of a signal indicating the operating state of the instrument controlled by the sub-system 220. It should be noted that the signal information can be utilized by the monitoring device 210 to determine whether or not the event has been generated or to specify a factor of the generation of the event which has been generated. It should be noted that the status data 3 shown in FIG. 1 is configured such that: the common region 31 is arranged at the head; and thereafter, the event region 32 and the signal region 33 are arranged in this order. However, the arrangement of the event region 32 and the signal region 33 is not limited to this. For example, the status data 3 may be configured such that: the signal region 33 is arranged after the common region 31; and the event region 32 is arranged after the signal region 33.

In the car monitoring system 200 according to Comparative Example of the present invention, the status data 3 is configured such that: the common region 31 is located in a range from a first bit to an X-th bit; the event region 32 is located in a range from an X+1-th bit to a Y-th bit; the signal region 33 is located in a range from a Y+1-th bit to a Z-th bit; and each region is fixed in a predetermined range. It should be noted that each of X, Y, and Z is an arbitrary natural number. In the event region 32, a piece of event information is assigned to each bit in advance. In the signal region 33, pieces of signal information are assigned to respective predetermined digit numbers.

As above, in the status data 3 utilized in the car monitoring system 200 according to Comparative Example of the present invention, data lengths of the regions are fixed. With this, head addresses and ranges of the regions can be easily recognized. Further, it is possible to recognize what type of information (the event information or the signal information) is stored in which bit counting from the first bit in each region. Furthermore, the data length of the status data 3 transmitted and received between the monitoring device 210 and the sub-system 220 can be fixed. Therefore, the amount of status data 3 transferred can be easily managed. Even when utilizing a transmission line in which the amount of data transferred is small, the status data 3 can be transmitted appropriately.

It should be noted that examples of the common information include time information and car positional information (information of the GPS). Further, the event information is information indicating the operating state of the sub-system 220. For example, when the sub-system 220 is a system configured to control open or close of a door, the event information may be information indicating whether or not a current supplied to a door motor is an overcurrent or whether or not a malfunction of a door controller has occurred. The signal information is information of a signal indicating an operation state (log) of each instrument included in the sub-system 220. The signal information is, for example, information indicating a change in a current value supplied to a motor in the sub-system 220 or a change in a voltage value applied to the motor in the sub-system 220.

The present inventors have diligently studied the car monitoring system 200 when the status data 3 transmitted from the sub-system 220 to the monitoring device 210 is changed. As a result, the present inventors have found the following problems.

First, as a configuration that is a premise of an explanation of the summary of the present invention, a configuration in which an event parameter file (EPF) 4 is held in each of the monitoring device 210 and the sub-systems 220 as shown in FIG. 2 in place of the ICD related to the event information will be considered. For convenience of explanation, the EPF 4 held in the sub-system 220 is referred to as a first EPF 4a, and the EPF 4 held in the monitoring device 210 is referred to as a second EPF 4b. When it is unnecessary to distinguish the first EPF 4a and the second EPF 4b in the following explanation, the term "EPF 4" is simply used.

The EPF 4 is a file defining a data structure of the event information contained in the event region 32 of the status data 3. For example, as shown in FIG. 3, the EPF 4 contains information indicating definitions of the event, i.e., information such as a code name (Code) for specifying the event, an event name (Name), an explanation of the event (Description), and an attribute of the event (Attributes). The attribute of the event may contain information, such as an importance of the event, necessity of record regarding a generation status of the event, and necessity of display of information regarding the event which has been generated.

As shown in FIG. 2, the sub-system 220 includes a sub-system controller 221 and a sub-system memory 222. The sub-system controller 221 controls various processing performed by respective instruments (not shown) included in the sub-system 220.

The sub-system controller 221 can be realized by a CPU, a microprocessor, or the like. The sub-system memory 222 is a readable-writable storage medium and stores the status data 3 to be transmitted to the monitoring device 210 and the first EPF 4a. The sub-system memory 222 is, for example, a RAM (Random Access Memory).

The car monitoring system 200 having the above configuration is configured such that: the sub-system 220 holds the first EPF 4a; the monitoring device 210 holds the second EPF 4b; and the version of the first EPF 4a and the version of the second EPF 4b are the same as each other. When the monitoring device 210 receives the status data 3 from the sub-system 220, the monitoring device 210 can refer to the second EPF 4b and interpret the event information stored in the event region 32 of the status data 3.

A range assigned as the event region 32 in the status data 3 is fixed in advance. Further, positions at which respective pieces of event information are stored in the event region 32 are also fixed in advance. When a certain piece of event information is added to or deleted from the event region 32, the data structure of the status data 3 changes. Therefore, in order that the changed status data 3 can be set or interpreted in both the monitoring device 210 and the sub-system 220 which process the status data 3, software needs to be updated in both the monitoring device 210 and the sub-system 220.

Therefore, the present inventors have found that there is a problem that if the status data 3 is frequently changed in the car monitoring system 200 shown in FIG. 2 according to Comparative Example of the present invention, work burden on a designer of the monitoring device 210 and a designer of the sub-system 220 increases. The present inventors have examined this problem, and as a result, obtained the following findings.

First, in recent years, Ethernet (trademark) can be utilized as a standard of a local area network constructed between the sub-system and the monitoring device, and the amount of data transferable between the sub-system and the monitoring device is significantly increasing. Therefore, at least the range of the event region 32 in the data structure of the status data 3 is set to be variable. Preferably, both the range of the event region 32 and the range of the signal region 33 are set to be variable. For example, when newly adding an event, new event information is added to an arbitrary position(s) of the event region 32. Further, when deleting an event, event information corresponding to the event is deleted from the event region 32.

When the event information is added to or deleted from the status data 3 as above, i.e., when the data structure of the event information stored in the event region 32 is changed, the first EPF 4a held in the sub-system 220 and the second EPF 4b held in the monitoring device 210 need to be changed in accordance with the change in the data structure. At the same time, the software installed in the monitoring device 210 and the software installed in the sub-system 220 need to be updated such that the event information can be set or interpreted based on the changed EPF 4.

The present inventors have found that even when the status data 3 is changed, an increase in work burden on the designer of the car monitoring system (the designer of the monitoring device 210 and the designer of the sub-system 220) can be prevented by the following configurations. Thus, the present invention was made. To be specific, the sub-system 220 is configured to be able to, based on the changed first EPF 4a, reconstruct the data structure of the event information in the event region 32 of the status data 3 and reset the pieces of event information.

On the other hand, the monitoring device 210 is configured to be able to, based on the changed second EPF 4b, reconstruct the data structure of the event information in the event region 32 of the status data 3 and interpret the pieces of event information.

The present inventors have found that by this configuration, it becomes unnecessary to update the software installed in the monitoring device and the software installed in the sub-system such that the status data 3 can be set or interpreted based on the changed EPF 4.

The above findings of the present inventors were previously unknown and includes new technical features which achieve significant operational advantages. Specifically, the present invention provides the following aspects.

A car monitoring system according to one aspect of the present invention includes: a sub-system configured to execute a predetermined function by controlling at least one instrument mounted on a railcar; and a monitoring device configured to monitor an operating state of the sub-system. The sub-system includes: a sub-system controller configured to create status data containing pieces of event information based on a signal output from the instrument and periodically transmit the status data to the monitoring device, the pieces of event information informing the monitoring device of a change in state of the instrument; and a first memory configured to store a first event parameter file which defines a data structure of an event region of the status data, the event region being a region in which the pieces of event information are stored. When the first event parameter file is changed, and the sub-system controller creates the status data, the sub-system controller reconstructs the data structure of the event region based on the changed first event parameter file and resets the pieces of event information in accordance with the reconstructed data structure.

According to the above configuration, when creating the status data, the sub-system controller can reconstruct the data structure of the event region based on the changed first event parameter file and reset the pieces of event information in accordance with the reconstructed data structure.

Therefore, when the data structure of the event region of the status data is changed, it is unnecessary for the designer of the car monitoring system to update the software installed in the sub-system controller such that the sub-system controller can reset the pieces of event information in accordance with the changed data structure of the event region.

Therefore, an effect of being able to prevent the increase in work burden on the designer of the car monitoring system when the status data is changed is obtained.

Further, the car monitoring system according to another aspect of the present invention may be configured such that: in the above configuration, the monitoring device includes a second memory configured to store the status data received from the sub-system controller and a second event parameter file defining the data structure of the event region contained in the status data and a monitoring device controller configured to monitor the operating state of the sub-system based on the status data; and when the second event parameter file is changed, and the monitoring device controller monitors the operating state of the sub-system, the monitoring device controller reconstructs the data structure of the event region based on the changed second event parameter file and interprets the pieces of event information in accordance with the reconstructed data structure.

According to the above configuration, when monitoring the operating state of the sub-system, the monitoring device controller can reconstruct the data structure of the event region based on the changed second event parameter file and interpret the pieces of event information in accordance with the reconstructed data structure.

Therefore, when the data structure of the event region of the status data is changed, it is unnecessary for the designer of the car monitoring system to update the software installed in the monitoring device controller such that the monitoring device controller can interpret the pieces of event information in accordance with the changed data structure of the event region.

Therefore, the increase in work burden on the designer of the car monitoring system when the status data is changed can be prevented.

Further, the car monitoring system according to yet another aspect of the present invention may be configured such that: in the above configuration, each of the pieces of event information corresponds to one-bit data in the event region; the pieces of event information are arranged in order from a first bit position in the event region; and the sub-system controller specifies positions of the pieces of event information based on the changed first event parameter file and reconstructs the data structure of the event region.

The positions of the pieces of event information specified based on the changed first event parameter file may be the positions of the pieces of event information after arbitrary piece(s) of event information is deleted or added or the positions of the pieces of event information after the order of arrangement of the pieces of event information is changed.

Further, the car monitoring system according to still another aspect of the present invention may be configured such that: in the above configuration, each of the pieces of event information corresponds to one-bit data in the event region; the pieces of event information are arranged in order from a first bit position in the event region; and the monitoring device controller specifies positions of the pieces of event information based on the changed second event parameter file and reconstructs the data structure of the event region.

The positions of the pieces of event information specified based on the changed second event parameter file may be the positions of the pieces of event information after arbitrary piece(s) of event information is deleted or added or the positions of the pieces of event information after the order of arrangement of the pieces of event information is changed.

The car monitoring system according to yet another aspect of the present invention may be configured such that: in the above configuration, the status data further contains pieces of signal information that is information of a signal indicating an operating state of the instrument controlled by the sub-system; in the sub-system, the first memory further stores a first signal parameter file defining a data structure of a signal region of the status data, the signal region being a region in which the pieces of signal information are stored; the first signal parameter file contains information specifying storage positions of the pieces of signal information in the signal region; and when the first signal parameter file is changed, and the sub-system controller creates the status data, the sub-system controller specifies the positions of the pieces of signal information based on the information specifying the storage positions of the pieces of signal information contained in the changed first signal parameter file, reconstructs the data structure of the signal region, and resets the pieces of signal information in accordance with the reconstructed data structure.

According to the above configuration, when creating the status data, the sub-system controller specifies the positions of the pieces of signal information based on the information specifying the storage positions of the pieces of signal information contained in the changed first signal parameter file and reconstructs the data structure of the signal region. Then, the sub-system controller can reset the pieces of signal information in accordance with the reconstructed data structure.

Therefore, when the data structure of the signal region of the status data is changed, it is unnecessary for the designer of the car monitoring system to update the software installed in the sub-system controller such that the sub-system controller can reset the pieces of signal information in accordance with the changed data structure of the signal region.

Therefore, the increase in work burden on the designer of the car monitoring system when the status data is changed can be prevented.

The car monitoring system according to still another aspect of the present invention may be configured such that: in the above configuration, the status data further contains pieces of signal information that is information of a signal indicating an operating state of the instrument controlled by the sub-system; in the monitoring device, the second memory further stores a second signal parameter file defining a data structure of a signal region of the status data, the signal region being a region in which the pieces of signal information are stored; the second signal parameter file contains information specifying storage positions of the pieces of signal information in the signal region; and when the second signal parameter file is changed, and the monitoring device controller monitors the operating state of the sub-system, the monitoring device controller specifies the positions of the pieces of signal information based on the information specifying the storage positions of the pieces of signal information contained in the changed second signal parameter file, reconstructs the data structure of the signal region, and interprets the pieces of signal information in accordance with the reconstructed data structure.

According to the above configuration, when monitoring the operating state of the sub-system, the monitoring device controller specifies the positions of the pieces of signal information based on the information specifying the storage positions of the pieces of signal information contained in the changed second signal parameter file and reconstructs the data structure of the signal region. Then, the monitoring device controller can interpret the pieces of signal information in accordance with the reconstructed data structure.

Therefore, when the data structure of the signal region of the status data is changed, it is unnecessary for the designer of the car monitoring system to update the software installed in the monitoring device controller such that the monitoring device controller can interpret the signal information in accordance with the changed data structure of the signal region.

Therefore, the increase in work burden on the designer of the car monitoring system when the status data is changed can be prevented.

Further, the car monitoring system according to yet another aspect of the present invention may be configured such that: in the above configuration, the second signal parameter file contains a conversion coefficient by which each of the pieces of signal information is converted into a value used in the monitoring device; and the monitoring device controller interprets the pieces of signal information contained in the signal region by utilizing the conversion coefficient contained in the second signal parameter file.

The conversion coefficient may be information indicating a unit for interpreting the signal information. For example, the conversion coefficient may be information regarding whether a value of the signal information contained in the status data received by the monitoring device controller indicates the number of times per predetermined time or a temperature (degree Celsius, degree Fahrenheit, degree Kelvin, or the like). Further, the conversion coefficient may be information indicating a correspondence relation between a value per bit in the signal region of the status data and a physical value.

According to the above configuration, since each of the first signal parameter file and the second signal parameter file contains the conversion coefficient, the monitoring device controller can correctly interpret the signal information contained in the status data received from the sub-system controller.

Embodiment 1

Configuration of Car Monitoring System

Hereinafter, Embodiment 1 of the present invention will be described with reference to the drawings. In the following description and the drawings, the same reference signs are used for the same or corresponding components, and a repetition of the same explanation is avoided.

Figure 4:
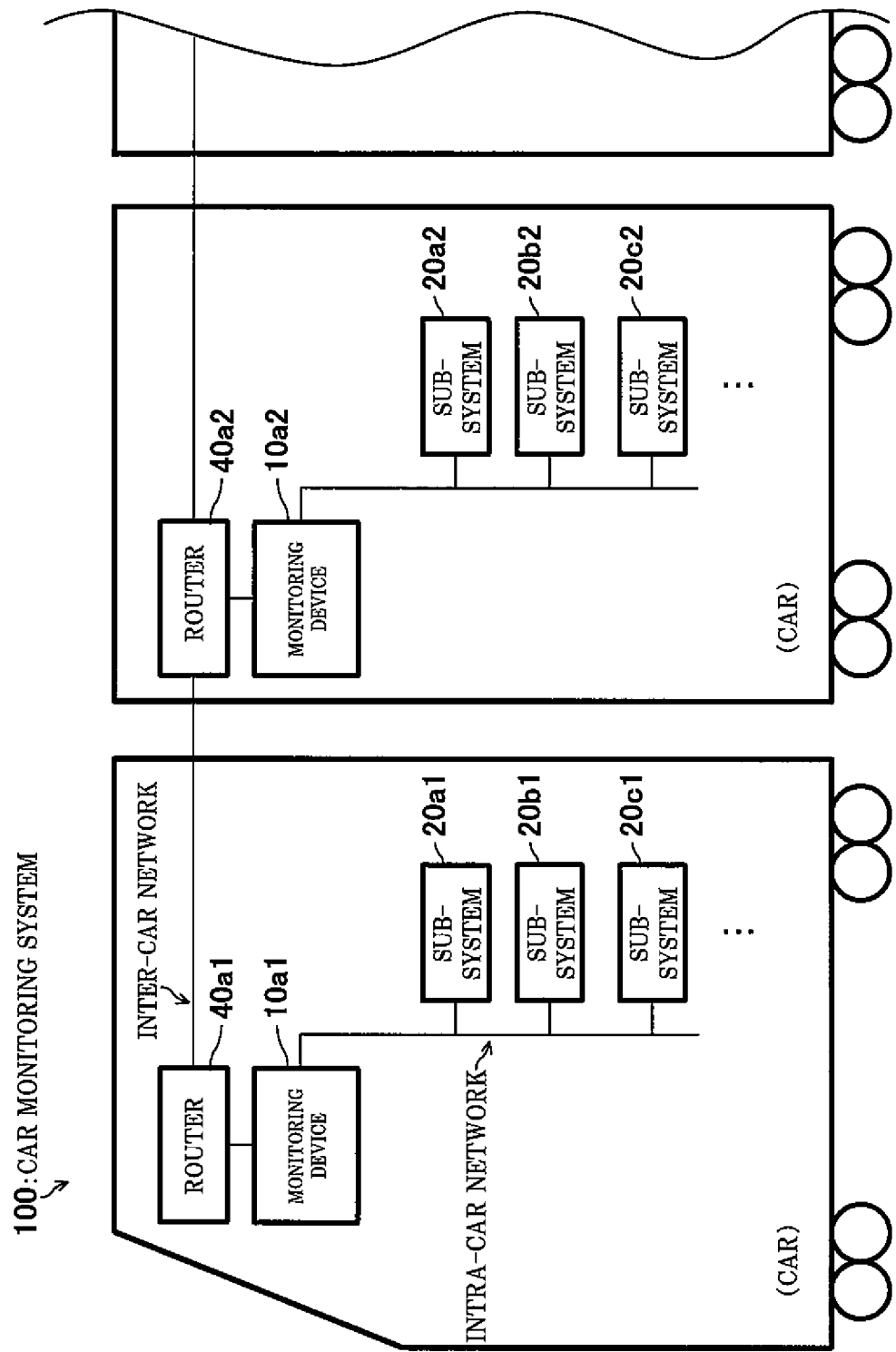
FIG. 4 is a diagram showing one example of a schematic configuration of the car monitoring system according to Embodiment 1 of the present invention.

First, a schematic configuration of a car monitoring system 100 according to Embodiment 1 of the present invention will be described with reference to FIG. 4. FIG. 4 is a diagram showing one example of the schematic configuration of the car monitoring system 100 according to Embodiment 1 of the present invention.

The car monitoring system 100 according to Embodiment 1 of the present invention is a system configured to monitor the operating states of sub-systems $20a1$ to $20c1$, $20a2$ to $20c2$, . . . provided in the cars. As shown in FIG. 4, the car monitoring system 100 includes a monitoring device ($10a1$, $10a2$, . . . ) and a plurality of sub-systems ($20a1$ to $20c1$, $20a2$ to $20c2$, . . . ) in each car. Hereinafter, when it is unnecessary to distinguish the plurality of sub-systems $20a1$ to $20c1$, $20a2$ to $20c2$, . . . , the term "sub-system 20" is simply used. Further, when it is unnecessary to distinguish the monitoring devices $10a1$, $10a2$, . . . provided in the respective cars, the term "monitoring device 10" is simply used.

Further, a local area network including the monitoring device 10 and the sub-systems 20 in each car is referred to as an intra-car network. Furthermore, the intra-car networks are connected to each other through routers to construct a local area network for all the cars. This local area network constructed for all the cars is referred to as an inter-car network.

As described above, the status data 3 indicating the operating state of the sub-system 20 is periodically transmitted from the sub-system 20 to the monitoring device 10. A transmission cycle of the status data 3 from the sub-system 20 to the monitoring device 10 is, for example, 20 to 100 msec. It should be noted that the transmission cycle of the status data 3 may be different among the sub-systems 20 in accordance with the function realized by each sub-system 20.

When the monitoring device 10 receives the status data 3 from the sub-system 20, the monitoring device 10 judges the operating state of the sub-system 20, or the monitoring device 10 converts the status data 3 into a format recognizable by humans and displays the status data 3 on a display device (not shown) connected to the monitoring device 10.

The monitoring device 10 that is any one of the plurality of monitoring devices $10a$, $10a2$, . . . provided in the inter-car network can be used as a master device which monitors all the cars. For example, in FIG. 4, when the monitoring device $10a1$ mounted on a head car is set as the master device which monitors all the cars, the monitoring device $10a1$ of the head car can receive the status data 3 from the sub-systems $20a1$, $20b1$, $20c1$, . . . in the intra-car network in the head car. In addition, the monitoring device $10a1$ of the head car can receive the status data 3 of the sub-systems $20a2$, $20b2$, $20c2$, . . . of another car from the monitoring device $10a2$ of the another car through routers $40a1$ and $40a2$.

It should be noted that for convenience of explanation, the car monitoring system 100 constituted by the monitoring device 10 and one sub-system 20 which are provided in the same car will be described below as one example. However, as described above, the number of sub-systems 20 included in the car monitoring system 100 is not limited to one and may be plural. Further, the car monitoring system 100 is not necessarily limited to a system constituted by the monitoring device 10 and the sub-system 20 which are provided in the same car. The car monitoring system 100 may be a system constituted by the monitoring device 10 and the sub-system 20 which are provided in different cars.

As shown in FIG. 1, the status data 3 transmitted from the sub-system 20 to the monitoring device 10 contains the common region 31, the event region 32, and the signal region 33. The status data 3 may be configured such that a piece of event information is stored in each bit of the event region 32. When a piece of event information is stored in each bit, the pieces of event information can be specified from the number of bits in the event region 32.

In the status data 3 according to Embodiment 1, the range of the event region 32 may be variable. When the event information is added or deleted, the range of the event region 32 is changed. Therefore, when the event information is added to or deleted from the status data 3, each of the monitoring device 10 and the sub-system 20 updates the EPF 4 shown in FIG. 3, and then, based on the updated EPF 4, reconstructs the data structure of the event region 32 and processes the pieces of event information. Further, storage positions of the pieces of event information in the status data 3 are changed in some cases. Even in such cases, each of the monitoring device 10 and the sub-system 20 can update the EPF 4 and reconstruct the data structure of the event region 32 based on the updated EPF 4.

Figure 5:
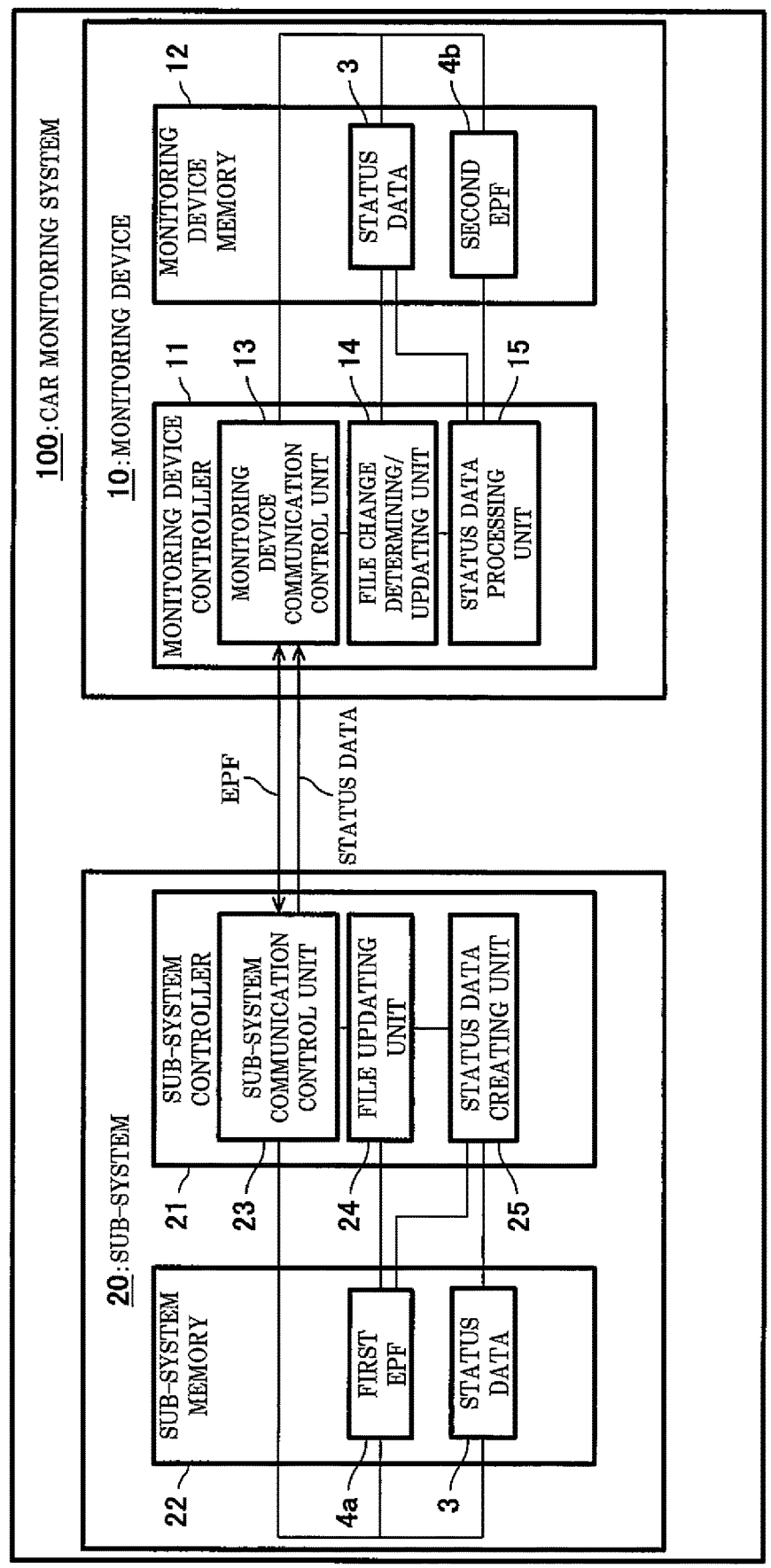
FIG. 5 is a block diagram schematically showing one example of configurations of major components of the car monitoring system according to Embodiment 1 of the present invention.

Hereinafter, details of the configuration of the car monitoring system 100 when the status data 3 is changed due to, for example, addition or deletion of the event information will be described with reference to FIG. 5 by using EPF update processing of the car monitoring system 100 as an example. FIG. 5 is a block diagram schematically showing one example of configurations of major components of the car monitoring system 100 according to Embodiment 1 of the present invention.

Configurations Related to EPF Update Processing

As shown in FIG. 5, the car monitoring system 100 includes the monitoring device 10 and the sub-system 20. It should be noted that when the car monitoring system 100 includes a plurality of sub-systems 20a1 to 20c1, 20a2 to 20c2, . . . , the monitoring device 10 may include the EPFs 4 corresponding to the sub-systems 20a1 to 20c1, 20a2 to 20c2, . . . . Herein, for convenience of explanation, the EPF update processing will be described by using the car monitoring system 100 including one sub-system 20 and the monitoring device 10 as an example.

Sub-System

First, the configuration of the sub-system 20 will be described. The sub-system 20 includes a sub-system controller 21 and a sub-system memory (first memory) 22.

The sub-system memory 22 is a readable-writable storage medium and is, for example, a RAM (Random Access Memory). The sub-system memory 22 stores the above-described first EPF 4a and the status data 3 created so as to be transmitted to the monitoring device 10. It should be noted that to recognize the operating states of the instruments, the sub-system 20 acquires, at all times, signals output from the instruments, creates or updates the status data 3, and stores the status data 3 in the sub-system memory 22. Examples of the signals output from the instruments include: detection results of sensors, such as galvanometers, voltmeters, and thermometers provided at the instruments; and diagnostic results of diagnostic software that diagnoses the generation of an abnormality of each instrument.

The sub-system controller 21 is a processing device (processor) configured to perform various control operations of the instruments included in the sub-system 20. For example, the sub-system controller 21 can also execute various processing related to the EPF update processing in the sub-system 20. The sub-system controller 21 can be realized by, for example, a CPU, a microprocessor, or the like. As shown in FIG. 5, the sub-system controller 21 includes, as functional blocks, a sub-system communication control unit 23, a file updating unit 24, and a status data creating unit 25.

The sub-system communication control unit 23 performs transmission and reception of information (data) between the sub-system 20 and the monitoring device 10. For example, the sub-system communication control unit 23 periodically transmits the status data 3, stored in the sub-system memory 22, to the monitoring device 10. Further, the sub-system communication control unit 23 receives the second EPF 4b transmitted from the monitoring device 10 and transmits the first EPF 4a to the monitoring device 10 in accordance with a request from the monitoring device 10. The sub-system communication control unit 23 may be configured to perform the above transmission and reception of the EPF 4 in a message data (MD) format.

When the second EPF 4b is updated to a new version in the monitoring device 10, or when the sub-system 20 requires a new-version first EPF 4a due to the addition or deletion of the event information or a change in order of arrangement of the pieces of event information, the file updating unit 24 updates the first EPF 4a.

The status data creating unit 25 refers to the first EPF 4a and creates the status data 3 based on detection results periodically acquired from sensors (not shown), diagnostic results periodically acquired from diagnostic software, or the like. For example, when the first EPF 4a is changed due to, for example, the addition of the event information as shown in FIG. 6, the status data creating unit 25 reconstructs the data structure of the event region 32 based on the changed first EPF 4a and sets the event information in accordance with the reconstructed data structure.

Figure 6:
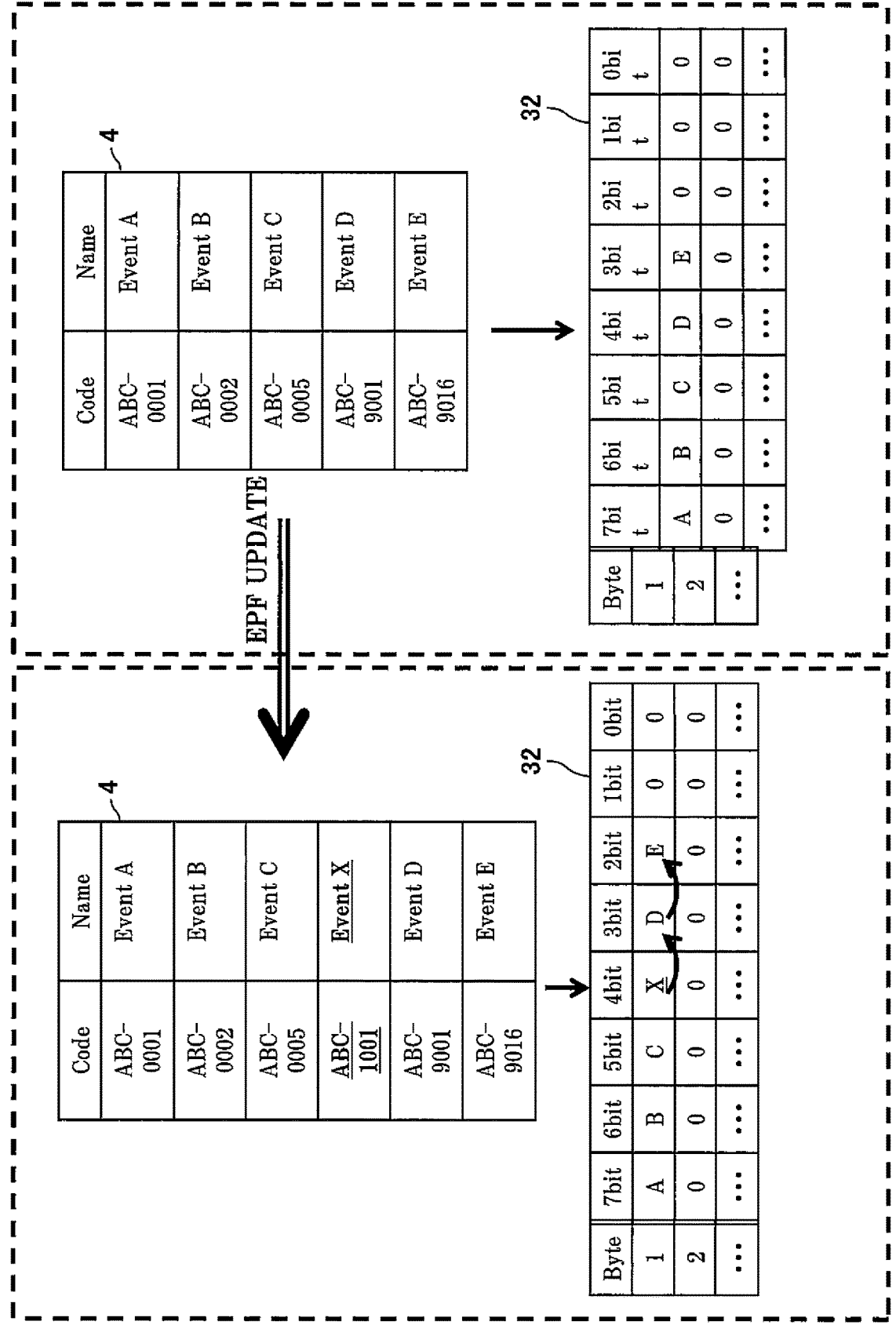
FIG. 6 is a schematic diagram showing one example of reconstruction processing of a data structure of an event region, the reconstruction processing being performed by a status data creating unit according to Embodiment 1.

FIG. 6 is a schematic diagram showing one example of reconstruction processing of the data structure of the event region 32, the reconstruction processing being performed by the status data creating unit 25 according to Embodiment 1. In FIG. 6, for convenience of explanation, only an event code name (Code) and an event name (Name) are shown as items contained in the EPF 4. However, the items contained in the EPF 4 are not limited to these. Further, in FIG. 6, A, B, C, D, E, . . . respectively denote signal names "Event A," "Event B," "Event C," "Event D," "Event E," . . . .

More specifically, as shown in FIG. 6, an event name "Event X" is newly added in the updated first EPF 4a. In this case, based on the updated first EPF 4a, the status data creating unit 25 rewrites the data structure such that: the data of "Event X" is stored between the event name "Event C" and the event name "Event D," i.e., the data of "Event X" is stored at a position corresponding to a row of 1st Byte and a column of a 4th bit in the event region 32; and each of the data of "Event D" and the data of "Event E" is moved by one bit to the right on the paper surface of FIG. 6.

As above, the status data creating unit 25 refers to the first EPF 4a, specifies the positions of the pieces of event information in the event region 32, and reconstructs the data structure of the event region 32. Then, the status data creating unit 25 resets the pieces of event information, received from the instruments, in the event region 32 in accordance with the reconstructed data structure.

The above-described functional blocks included in the sub-system 20 can be realized in such a manner that the sub-system controller 21 loads programs, stored in a ROM (not shown), into a RAM and executes the programs.

Monitoring Device

The monitoring device 10 includes a monitoring device controller 11 and a monitoring device memory (second memory) 12.

The monitoring device memory 12 is a readable-writable storage medium and is, for example, a RAM (Random Access Memory). The monitoring device memory 12 stores the above-described second EPF 4b and the status data 3 periodically transmitted from the sub-system 20.

The monitoring device controller 11 is a processing device (processor) configured to perform various control operations of the instruments included in the monitoring device 10. For example, the monitoring device controller 11 can also execute various processing related to the EPF update processing in the monitoring device 10. The monitoring device controller 11 can be realized by, for example, a CPU, a microprocessor, or the like. As shown in FIG. 5, the monitoring device controller 11 includes, as functional blocks, a monitoring device communication control unit 13, a file change determining/updating unit 14, and a status data processing unit 15.

The monitoring device communication control unit 13 performs transmission and reception of information (data) between the sub-system 20 and the monitoring device 10. For example, the monitoring device communication control unit 13 receives the status data 3 periodically transmitted from the sub-system 20 and stores the status data 3 in the monitoring device memory 12. Further, the monitoring device communication control unit 13 transmits the second EPF 4b to the sub-system 20 and receives the first EPF 4a from the sub-system 20. Furthermore, the monitoring device communication control unit 13 can request the sub-system 20 to transmit the first EPF 4a. It should be noted that the monitoring device communication control unit 13 may be configured to perform the request of the transmission of the first EPF 4a and the transmission and reception of the EPF 4 in the MD format.

Based on information of the version of the first EPF 4a stored in the common region 31 of the status data 3 transmitted from the sub-system 20, the file change determining/updating unit 14 determines whether or not the version of the first EPF 4a and the version of the second EPF 4b coincide with each other. When the file change determining/updating unit 14 determines that the version of the first EPF 4a and the version of the second EPF 4b do not coincide with each other, the update of the EPF 4 can be executed as below.

When the file change determining/updating unit 14 determines that the version of the second EPF 4b held in the monitoring device 10 is older than the version of the first EPF 4a held in the sub-system 20, the monitoring device communication control unit 13 requests the sub-system 20 to transmit the first EPF 4a. When the first EPF 4a is transmitted from the sub-system 20 in accordance with this request, the file change determining/updating unit 14 updates the second EPF 4b, stored in the monitoring device memory 12, based on the first EPF 4a received from the sub-system 20.

In contrast, when the file change determining/updating unit 14 determines that the version of the first EPF 4a held in the sub-system 20 is older than the version of the second EPF 4b held in the monitoring device 10, the monitoring device communication control unit 13 transmits the second EPF 4b to the sub-system 20 to make the sub-system 20 update the first EPF 4a.

The status data processing unit 15 receives the status data 3 periodically transmitted from the sub-system 20 and processes the status data 3 with reference to the second EPF 4b. When the second EPF 4b is changed due to the addition or deletion of the event information or the change in order of arrangement of the pieces of event information, as with the status data creating unit 25 of the sub-system controller 21, the status data processing unit 15 reconstructs the data structure of the event region 32 based on the changed second EPF 4b as shown in FIG. 6. Then, the status data processing unit 15 monitors the operating state of the sub-system 20 by interpreting the event information in accordance with the reconstructed data structure. It should be noted that the reconstruction of the data structure of the event region 32 by the status data processing unit 15 is performed based on the changed EPF 4 (second EPF 4b) in the same manner as the reconstruction of the data structure of the event region 32 by the status data creating unit 25. Therefore, a detailed explanation of the reconstruction of the data structure of the event region 32 by the status data processing unit 15 is omitted.

EPF Update Processing

Figure 7:
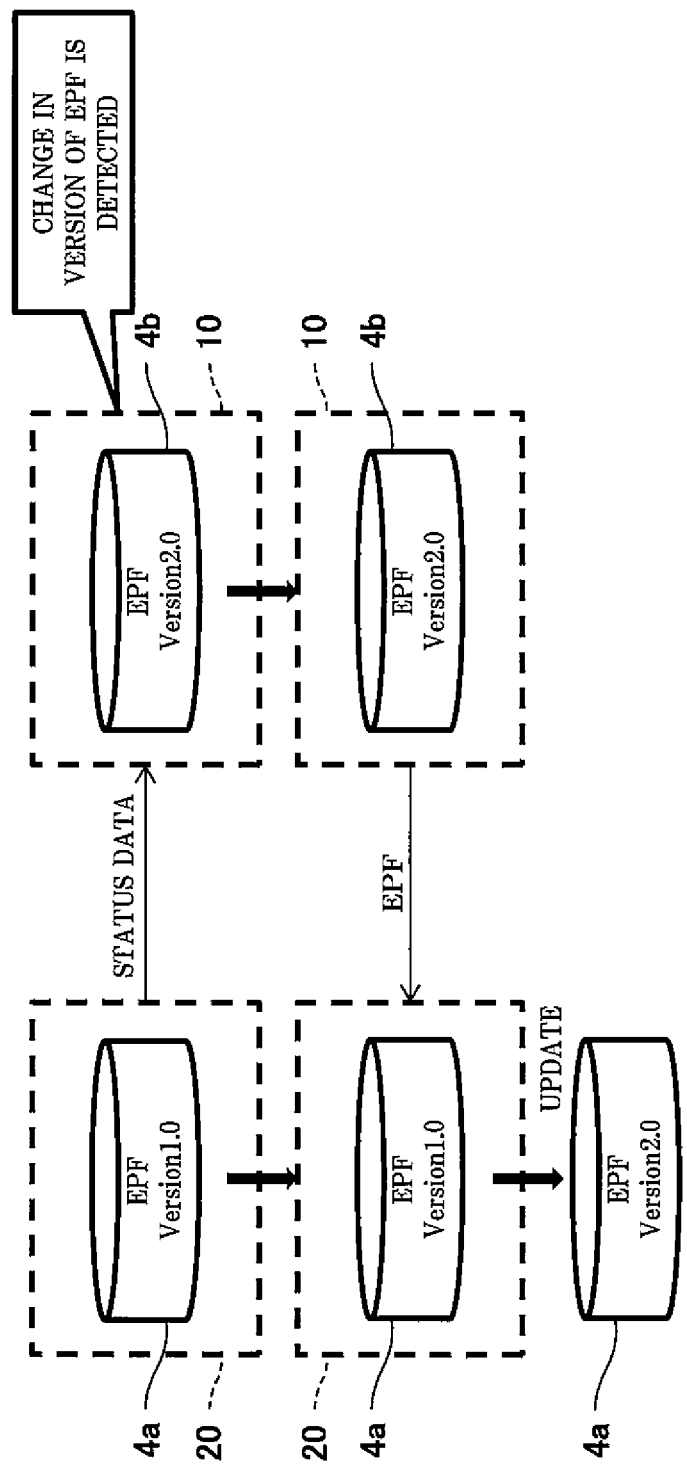
FIG. 7 is a schematic diagram showing one example of EPF update processing in the car monitoring system when the version of a second EPF held in a monitoring device is changed.
Figure 8:
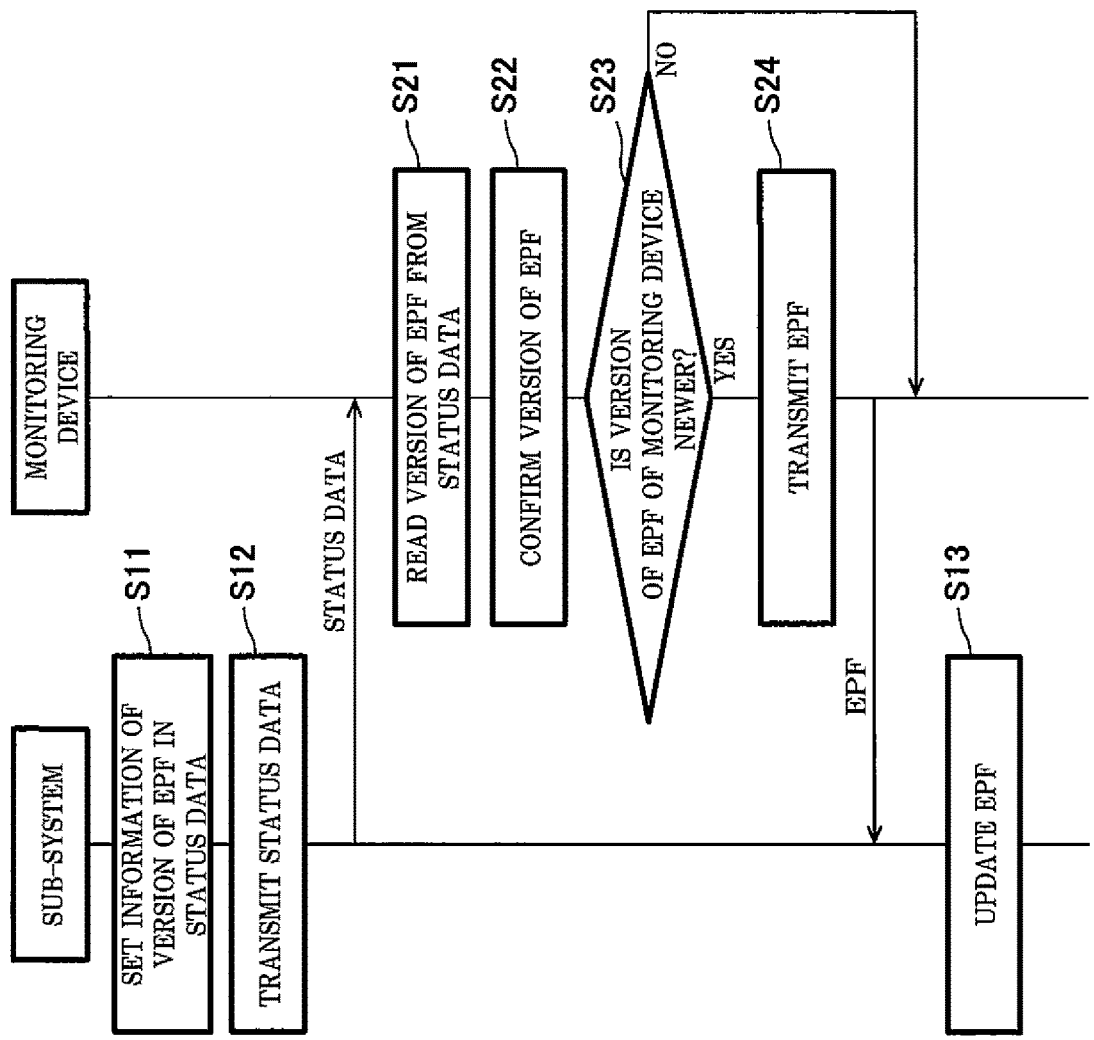
FIG. 8 is a sequence diagram showing, in time series, one example of the EPF update processing in the car monitoring system when the version of the second EPF held in the monitoring device is changed.
Figure 9:
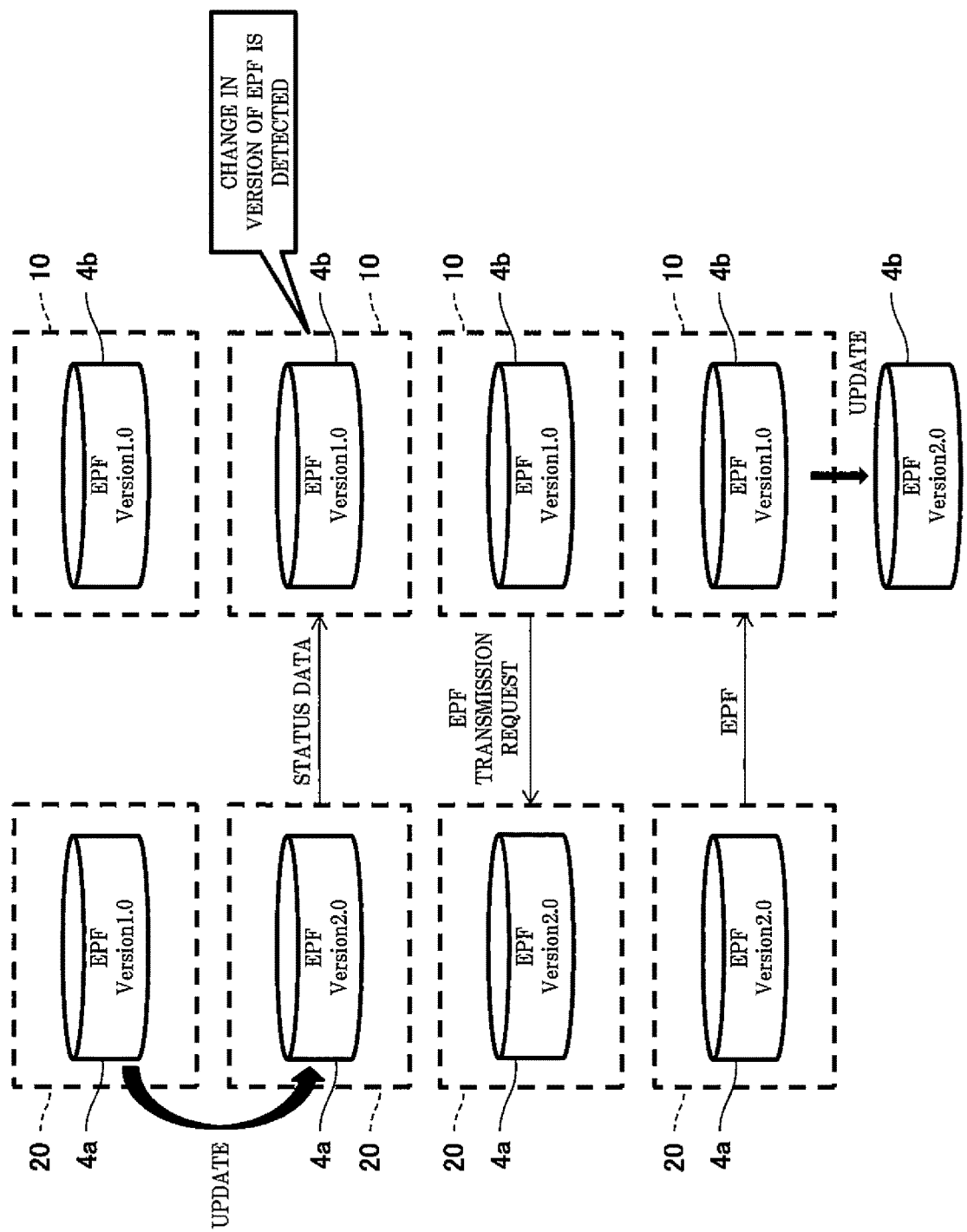
FIG. 9 is a schematic diagram showing one example of the EPF update processing in the car monitoring system when the version of a first EPF held in a sub-system is changed.
Figure 10:
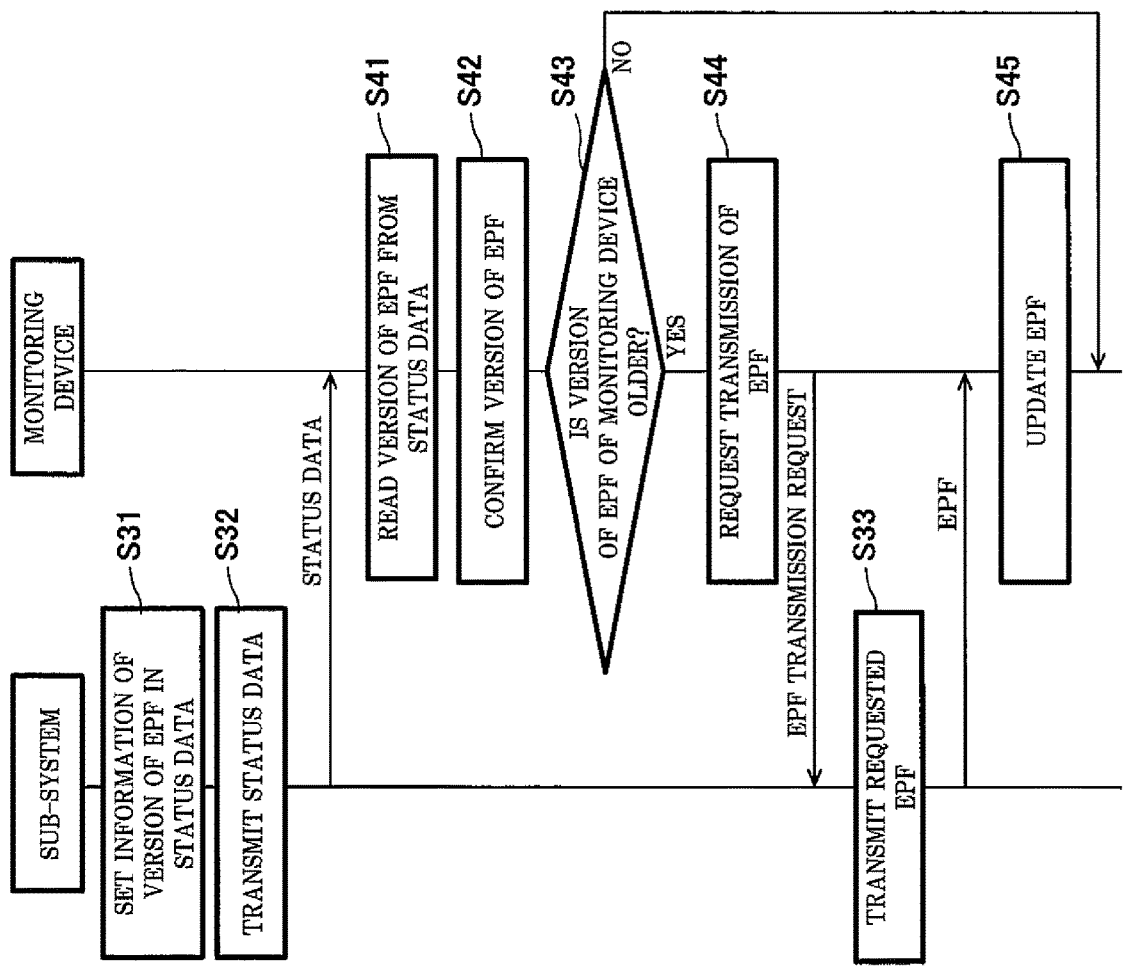
FIG. 10 is a sequence diagram showing, in time series, one example of the EPF update processing in the car monitoring system when the version of the first EPF held in the sub-system is changed.

Next, one example of the EPF update processing will be described with reference to FIGS. 7 to 10. FIG. 7 is a schematic diagram showing one example of the EPF update processing in the car monitoring system 100 when the version of the second EPF 4b held in the monitoring device 10 is changed. FIG. 8 is a sequence diagram showing, in time series, one example of the EPF update processing in the car monitoring system 100 when the version of the second EPF 4b held in the monitoring device 10 is changed. FIG. 9 is a schematic diagram showing one example of the EPF update processing in the car monitoring system 100 when the version of the first EPF 4a held in the sub-system 20 is changed. FIG. 10 is a sequence diagram showing, in time series, one example of the EPF update processing in the car monitoring system 100 when the version of the first EPF 4a held in the sub-system 20 is changed.

First, the EPF update processing when the version of the second EPF 4b is changed in the monitoring device 10 will be described with reference to FIGS. 7 and 8.

In the sub-system 20, when the status data creating unit 25 included in the sub-system controller 21 creates or updates the status data 3 to be transmitted to the monitoring device 10, the status data creating unit 25 sets the information of the version of the first EPF 4a in the common region 31 of the status data 3 (Step S11). Then, the sub-system communication control unit 23 transmits the status data 3 to the monitoring device controller 11 included in the monitoring device 10 (Step S12).

When the monitoring device communication control unit 13 of the monitoring device controller 11 receives the status data 3, the file change determining/updating unit 14 reads the version of the first EPF 4a of the sub-system 20 from the common region 31 of the status data 3 (Step S21). Then, the file change determining/updating unit 14 compares the version of the first EPF 4a with the version of the second EPF 4b stored in the monitoring device memory 12 and confirms whether or not these versions coincide with each other (Step S22).

Thus, the monitoring device controller 11 can detect whether or not the first EPF 4a or the second EPF 4b has been changed (updated). When the first EPF 4a and the second EPF 4b do not coincide with each other, the monitoring device controller 11 updates the EPF 4 such that the version of the first EPF 4a and the version of the second EPF 4b coincide with each other. It should be noted that when the monitoring device controller 11 determines that the first EPF 4a and the second EPF 4b do not coincide with each other, the monitoring device controller 11 may discard the status data which has been received when the above determination was performed.

Specifically, in the example shown in FIG. 7, the version of the first EPF 4a of the sub-system 20 is "Version 1.0," and the version of the second EPF 4b of the monitoring device 10 is "Version 2.0." It should be noted that the larger the number of the version of the EPF 4 is, the newer the version of the EPF 4 is.

When the file change determining/updating unit 14 determines that the version of the second EPF 4b held in the monitoring device 10 is newer than the version of the first EPF 4a (YES in Step S23), the monitoring device communication control unit 13 transmits the EPF 4 (second EPF 4b), stored in the monitoring device memory 12, to the sub-system controller 21 (Step S24). In the example of FIG. 7, the EPF 4 (second EPF 4b) of "Version 2.0" is transmitted from the monitoring device controller 11 to the sub-system controller 21.

It should be noted that when the file change determining/updating unit 14 determines that the version of the second EPF 4b held in the monitoring device 10 and the version of the first EPF 4a held in the sub-system 20 coincide with each other (NO in Step S23), the file change determining/updating unit 14 continuingly receives the status data 3.

When the sub-system communication control unit 23 of the sub-system controller 21 receives the EPF 4 (second EPF 4b) of "Version 2.0" from the monitoring device controller 11, the file updating unit 24 updates the first EPF 4a of "Version 1.0" stored in the sub-system memory 22 based on the received second EPF 4b (Step S13).

As above, when the first EPF 4a is updated by the file updating unit 24, i.e., the version of the first EPF 4a is changed, the status data creating unit 25 refers to the updated first EPF 4a and reconstructs the data structure of the event region 32 of the status data 3. Then, the status data creating unit 25 creates the status data 3 by setting the pieces of event information in accordance with the reconstructed data structure.

Next, the EPF update processing when the version of the first EPF 4a is changed in the sub-system 20 will be described with reference to FIGS. 9 and 10.

First, as with Steps S11 and S12 shown in FIG. 8, when the status data creating unit 25 included in the sub-system controller 21 creates or updates the status data 3 to be transmitted to the monitoring device 10, the status data creating unit 25 sets the information of the version of the first EPF 4a in the common region 31 of the status data 3 (Step S31). In the example of FIG. 9, before the status data 3 is transmitted from the sub-system 20 to the monitoring device 10, the version of the first EPF 4a held in the sub-system 20 is updated from "Version 1.0" to "Version 2.0." Therefore, in Step S31, "Version 2.0" is set in the common region 31 of the status data 3 as the information indicating the version of the first EPF 4a. Then, the sub-system communication control unit 23 transmits the status data 3 to the monitoring device controller 11 included in the monitoring device 10 (Step S32).

When the monitoring device communication control unit 13 of the monitoring device controller 11 receives the status data 3, the file change determining/updating unit 14 reads the version of the first EPF 4a of the sub-system 20 from the common region 31 of the status data 3 (Step S41). Then, the file change determining/updating unit 14 compares the version of the first EPF 4a with the version of the second EPF 4b stored in the monitoring device memory 12 and confirms whether or not these versions coincide with each other (Step S42).

Thus, the monitoring device controller 11 can detect whether or not the first EPF 4a or the second EPF 4b has been changed (updated). When the first EPF 4a and the second EPF 4b do not coincide with each other, the monitoring device controller 11 updates the EPF 4 such that the version of the first EPF 4a and the version of the second EPF 4b coincide with each other.

Specifically, in the example shown in FIG. 9, the version of the first EPF 4a of the sub-system 20 is "Version 2.0," and the version of the second EPF 4b of the monitoring device 10 is "Version 1.0."

When the file change determining/updating unit 14 determines that the version of the second EPF 4b held in the monitoring device 10 is older than the version of the first EPF 4a (YES in Step S43), the monitoring device communication control unit 13 requests the sub-system controller 21 to transmit the first EPF 4a (Step S44).

In the sub-system 20, when the sub-system communication control unit 23 of the sub-system controller 21 receives the request of the transmission of the first EPF 4a from the monitoring device controller 11, the sub-system communication control unit 23 reads the first EPF 4a from the sub-system memory 22 and transmits the first EPF 4a to the monitoring device controller 11 (Step S33).

In the monitoring device 10, when the monitoring device communication control unit 13 of the monitoring device controller 11 receives the first EPF 4a from the sub-system controller 21, the file change determining/updating unit 14 updates contents of the second EPF 4b stored in the monitoring device memory 12 based on the first EPF 4a (Step S45).

As above, when the second EPF 4b is updated by the file change determining/updating unit 14, i.e., the version of the second EPF 4b is changed, the status data processing unit 15 refers to the updated second EPF 4b and reconstructs the data structure of the event region 32 of the status data 3. Then, the status data processing unit 15 monitors the operating state of the sub-system 20 by interpreting the event information in accordance with the reconstructed data structure.

It should be noted that the above-described EPF update processing is one example, and the update (synchronization) of the EPF 4 is not limited to this EPF update processing. Other update processing methods may be adopted as long as the versions of the EPFs can be synchronized with each other at appropriate timing between the monitoring device 10 and the sub-system 20.

Embodiment 2

Figure 11:
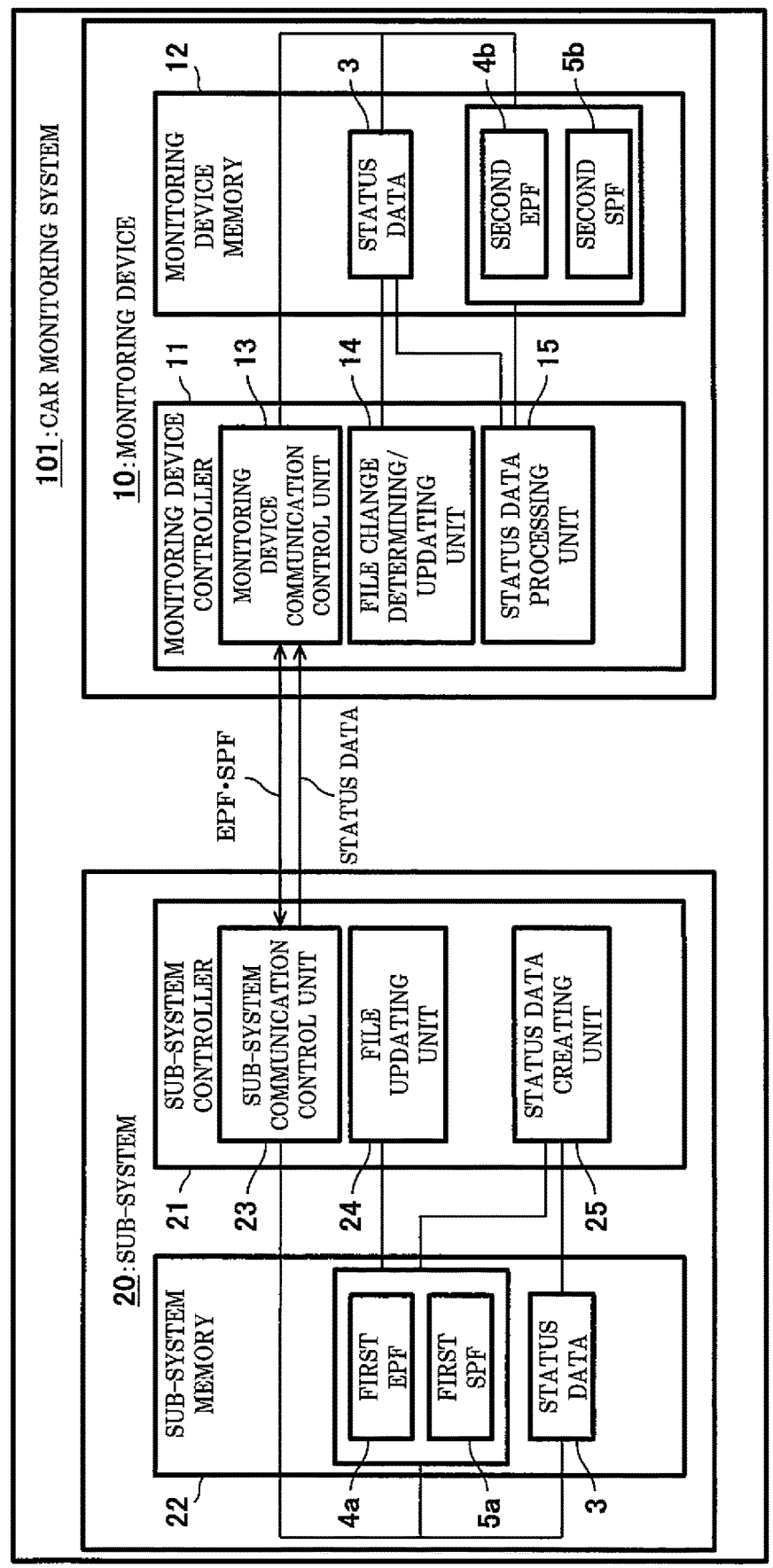
FIG. 11 is a block diagram schematically showing one example of configurations of major components of the car monitoring system according to Embodiment 2 of the present invention.
Figure 14:
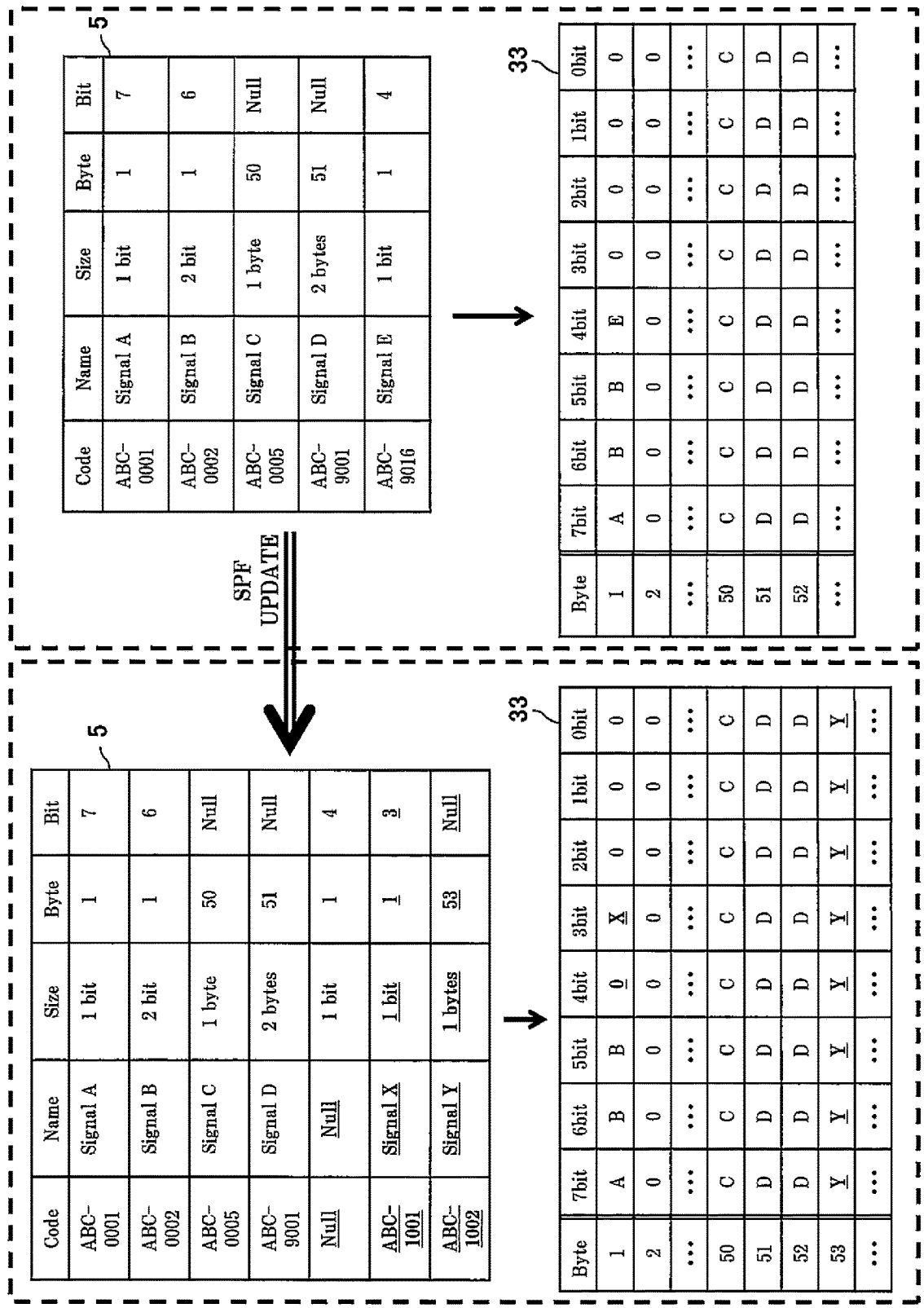
FIG. 14 is a schematic diagram showing one example of the reconstruction processing of the data structure of the signal region, the reconstruction processing being performed by the status data creating unit according to Embodiment 2.

Next, a car monitoring system 101 according to Embodiment 2 of the present invention will be described with reference to FIGS. 11 to 14. FIG. 11 is a block diagram schematically showing one example of configurations of major components of the car monitoring system 101 according to Embodiment 2 of the present invention. FIG. 12 is a table showing one example of contents of a SPF 5 utilized in the car monitoring system 101 according to Embodiment 2. FIG. 13 is a diagram schematically showing one example of storage positions of pieces of signal information in the signal region 33 of the status data 3 utilized in the car monitoring system 101 according to Embodiment 2. FIG. 14 is a schematic diagram showing one example of reconstruction processing of the data structure of the signal region 33, the reconstruction processing being performed by the status data creating unit 25 according to Embodiment 2. Further, in FIGS. 13 and 14, A, B, C, D, E, . . . respectively denote signal names "Signal A," "Signal B," "Signal C," "Signal D," "Signal E," . . . .

The car monitoring system 101 according to Embodiment 2 is different from the car monitoring system 100 according to Embodiment 1 in that: each of the monitoring device 10 and the sub-system 20 holds the signal parameter file (SPF)

5; and information indicating the version of the SPF 5 is further contained in the common region 31 of the status data 3.

Further, the car monitoring system 101 according to Embodiment 2 is different from the car monitoring system 100 according to Embodiment 1 in that the status data creating unit 25 included in the sub-system controller 21 refers to a first SPF 5a in addition to the first EPF 4a and creates the status data 3 based on detection results periodically acquired from sensors (not shown), diagnostic results periodically acquired from diagnostic software, or the like. Furthermore, when the first SPF 5a is changed due to addition or deletion of the signal information, a change in order of arrangement of the pieces of signal information, or the like, the status data creating unit 25 specifies the positions of the pieces of signal information in the signal region 33 based on the changed first SPF 5a and reconstructs the data structure of the signal region 33. Furthermore, the car monitoring system 101 according to Embodiment 2 is different from the car monitoring system 100 according to Embodiment 1 in that the signal information is set or updated in accordance with the reconstructed data structure.

Furthermore, the status data processing unit 15 included in the monitoring device controller 11 refers to a second SPF 5b in addition to the second EPF 4b and processes the status data 3 periodically received from the sub-system 20. When the second SPF 5b is changed due to the addition or deletion of the signal information, the change in order of arrangement of the pieces of signal information, or the like, the status data processing unit 15 reconstructs the data structure of the signal region 33 based on the changed second SPF 5b as shown in FIG. 14 as with the status data creating unit 25 of the sub-system controller 21. Then, the car monitoring system 101 according to Embodiment 2 is different from the car monitoring system 100 according to Embodiment 1 in that the pieces of signal information are interpreted in accordance with the reconstructed data structure.

Further, the car monitoring system 101 according to Embodiment 2 is different from the car monitoring system 100 according to Embodiment 1 in that based on the information of the version of the first SPF 5a stored in the common region 31 of the status data 3 transmitted from the sub-system 20, the file change determining/updating unit 14 included in the monitoring device controller 11 determines whether or not the version of the first SPF 5a and the version of the second SPF 5b coincide with each other. When the file change determining/updating unit 14 determines that the version of the first SPF 5a and the version of the second SPF 5b do not coincide with each other, the file change determining/updating unit 14 updates the SPF 5 as with the update of the EPF 4.

Other than the above configurations, the car monitoring system 101 according to Embodiment 2 is the same as the car monitoring system 100 according to Embodiment 1. Therefore, the same reference signs are used for the same components, and explanations thereof are omitted. It should be noted that for convenience of explanation, the SPF 5 held in the sub-system 20 is the first SPF 5a, and the SPF 5 held in the monitoring device 10 is the second SPF 5b. Further, when it is unnecessary to distinguish the first SPF 5a and the second SPF 5b, the term "SPF 5" is simply used.

First, the SPF 5 will be described. The SPF 5 is a file defining the data structure of the signal information that is information of a signal indicating the operating state of the instrument controlled by the sub-system 20. For example, as shown in FIG. 1, the SPF 5 contains a code name (Code) for specifying the signal information and a signal information name (Name). Further, as information for specifying the storage position (stored position) of the signal information in the signal region 33, the SPF 5 contains: a data size (Size) of each piece of signal information; and a byte position (Byte) and bit position (Bit) for specifying a storage start position of the signal information in the signal region 33.

As above, each piece of event information described above corresponds to one-bit data in the event region 33, and the pieces of event information are arranged in order from a first bit position in the event region 33. The number of events in the EPF 4 corresponds to the data size of the event information in the event region 33. The order of the events in the EPF 4 corresponds to the order of the pieces of event information stored in the event region 33. On the other hand, the SDF 5 contains the information (the byte position (Byte) and the bit position (Bit)) of the stored positions of the pieces of signal information in the signal region 33.

Furthermore, the SPF 5 may contain a conversion coefficient by which the signal information is converted into a value (physical quantity) used in the monitoring device 10. The conversion coefficient may be information indicating a unit for interpreting the signal information. For example, the conversion coefficient may be information regarding whether a value of the signal information contained in the status data received by the monitoring device controller 11 indicates the number of times per predetermined time or a temperature (degree Celsius, degree Fahrenheit, degree Kelvin, or the like). Further, the conversion coefficient may be information indicating a correspondence relation between a value per bit in the signal region of the status data and a physical value. Specifically, when a signal has a data size of one byte, the signal may take one of 0th to 255th byte in the signal region 33 of the status data 3. At this time, when the conversion coefficient is defined such that, for example, one bit corresponds to 1 A, 0 bit is interpreted as 0 A, one bit is interpreted as 1 A, and 255 bits are interpreted as 255 A. The conversion coefficient may be information indicating a correspondence relation between a value per bit in the signal region of the status data and a state (states) of the sub-system 20 indicated by the value.

For example, in FIG. 12, the conversion coefficient of "Signal A" is set to "2 states/bit" (two states with respect to one bit), and the conversion coefficient of "Signal B" is set to "4 states/bit" (four states with respect to one bit). The conversion coefficient of "Signal C" is set to "1 A/bit" (1 A with respect to one bit), and the conversion coefficient of "Signal D" is set to "0.1 Hz/bit" (0.1 Hz with respect to one bit). The conversion coefficient of "Signal E" is set to "2 states/bit" (two states with respect to one bit).

The signal information stored in the signal region 33 of the status data 3 may be analog data, such as a current value or a voltage value, or may be digital data, such as a diagnostic result of diagnostic software. Therefore, the pieces of signal information may be arranged in the signal region 33 as shown in FIG. 13, for example.

For example, the signal information specified by the name "Signal A" is defined in the SPF 5 shown in FIG. 12 such that: the data size is 1 bit; the byte position in the signal region 33 is 1st byte; and the bit position is 7th bit. Therefore, regarding "Signal A," one-bit data is stored at a position corresponding to a row of 1st byte and a column of 7th bit in the signal region 33 of the status data 3. To be specific, "Signal A" is stored in a region "A" shown in FIG. 13. Further, for example, the signal information specified by the same "Signal D" is defined in the SPF 5 shown in FIG. 12 such that: the data size is 2 bytes; the byte position in the signal region 33 is 51st byte; and the bit position is Null (which indicates nothing). Therefore, regarding "Signal D," two-byte data is stored from a first bit (7th bit) in a row of 51st byte in the signal region 33 of the status data 3. To be specific, "Signal D" is stored in regions where a plurality of "D" are arranged in FIG. 13, i.e., regions corresponding to 7th to 0th bits of 51st byte and regions corresponding to 7th to 0th bits of 52nd byte.

As above, the SPF 5 can define the storage positions (stored positions) of the pieces of signal information in the signal region 33 of the status data 3. Therefore, even when the data length of the signal information transmitted from the sub-system 20 to the monitoring device 10 varies, the sub-system 20 can store the signal information at arbitrary positions in the signal region 33 of the status data 3. Further, the monitoring device 10 can refer to the SPF 5 and specify the pieces of signal information in the signal region 33 of the status data 3.

Next, one example of the reconstruction processing of the data structure of the signal region 33 by the status data creating unit 25 will be described with reference to FIG. 14. For convenience of explanation, as items contained in the SPF 5, FIG. 14 shows: a code name (Code) of the signal information; a signal information name (Name); a data size (Size) of the signal information; and information (Byte and Bit) indicating a storage start position of the signal information in the signal region 33. However, the items contained in the SPF 5 are not limited to these. For example, as shown in FIG. 12, the conversion coefficient may also be contained.

As shown in FIG. 14, in the updated first SPF 5a, the signal information names "Signal X" and "Signal Y" are newly added, and the signal information name "Signal E" is deleted. In this case, based on the updated first SPF 5a, the status data creating unit 25 stores "0" in a position (corresponding to a row of 1st byte and a column of 4th bit) in which the signal information name "Signal D" was being stored, the "0" indicating that there is no data. Further, the status data creating unit 25 stores the data of "Signal X" in a position corresponding to a row of 1st byte and a column of 3rd bit in the signal region 33 and also stores the data of "Signal Y" in all the bits (one byte) corresponding to a row of 53rd byte.

As above, the status data creating unit 25 reconstructs the data structure of the signal region 33 and resets the signal information, received from each instrument, in the signal region 33 in accordance with the reconstructed data structure.

Further, as with the reconstruction of the data structure of the signal region 33 by the status data creating unit 25, the status data processing unit 15 can reconstruct the data structure of the signal region 33 based on the changed second SPF 5b. Then, the status data processing unit 15 can interpret the signal information in accordance with the reconstructed data structure.

The car monitoring system 101 according to Embodiment 2 can perform the update processing of the SPF 5 in the same manner as the update processing (EPF update processing) of the EPF 4 in the car monitoring system 100 according to Embodiment 1. Therefore, an explanation of the update processing of the SPF 5 is omitted.

In the car monitoring system 101 according to Embodiment 2, the update processing of the SPF 5 and the update processing of the EPF 4 described in Embodiment 1 may be performed in parallel.

In the present disclosure, all or some of the functional blocks included in the monitoring device controller 11 and the sub-system controller 21 shown in FIGS. 5 and 11 may be executed by at least one electronic circuit including a semiconductor device or a semiconductor integrated circuit (IC). The IC may be integrated on a single chip or may be configured by a combination of a plurality of chips.

All or some of the functional blocks included in the monitoring device controller 11 and the sub-system controller 21 may be realized by software. When all or some of the functional blocks are realized by software, each of the monitoring device controller 11 and the sub-system controller 21 include: a CPU (central processing unit) or MPU (micro processing unit) which executes commands of control programs which realize functions; for example, a ROM (read only memory) which stores the above control programs; for example, a RAM (Random Access Memory) which develops the above control programs; and a memory apparatus (recording medium), such as a memory, which stores the above programs and various pieces of data. The object of the present invention can also be achieved in such a manner that: a recording medium in which program codes (execution-format programs, intermediate code programs, source programs) of the control programs of the monitoring device controller 11 and the sub-system controller 21 that are software which realizes the above-described functions are recorded in a computer-readable manner is supplied to the monitoring device controller 11 and the sub-system controller 21; and the computers (or the CPUs or the MPUs) read and execute the program codes stored in the recording medium.

Examples of the recording medium include: tapes, such as magnetic tapes and cassette tapes; disks, such as magnetic disks (floppy (trademark) disks, hard disks, etc.) and optical disks (CD-ROM, MO, MD, DVD, CD-R, etc.); cards, such as IC cards (memory cards) and optical cards; and semiconductor memories, such as mask ROM, EPROM, EEPROM, and flash ROM.

Further, the monitoring device controller 11 and the sub-system controller 21 may be configured to be connectable with a communication network, and the control program codes may be supplied through the communication network. The communication network is not especially limited, and the Internet, intranet, extranet, LAN, ISDN, VAN, CATV communication network, virtual private network, telephone network, mobile communication network, satellite communication network, or the like may be utilized.

Further, a transmission medium constituting the communication network is not especially limited. For example, wires, such as IEEE1394, USB, power-line carrier, cable TV line, telephone line, and ADSL line, and wireless, such as infrared light (IrDA, a remote controller, etc.), Bluetooth (trademark), 802.11 wireless, HDR, mobile phone network, satellite channel, and terrestrial digital network, may be utilized. It should be noted that the present invention may be realized even when the program code is in the form of a computer data signal embodied by electronic transmission and embedded in a carrier wave.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The car monitoring system 100 of the present invention is useful as a system which is constituted by the monitoring device 10 and the plurality of sub-systems 20 and in which signals are periodically transmitted from the plurality of sub-systems 20 to the monitoring device 10 at all times. Especially, the car monitoring system 100 of the present invention is useful as a system in a railcar in which the status data 3 is periodically transmitted from the sub-system 20 to the monitoring device 10.

REFERENCE SIGNS LIST

3 status data
10 monitoring device
11 monitoring device controller
12 monitoring device memory (second memory)
20 sub-system
21 sub-system controller
22 sub-system memory (first memory)
31 common region
32 event region
33 signal region
100 car monitoring system
101 car monitoring system

The invention claimed is:

1. A car monitoring system comprising:
a sub-system configured to execute a predetermined function by controlling at least one instrument mounted on a railcar; and
a monitoring device configured to monitor an operating state of the sub-system, wherein:
the sub-system includes
a sub-system controller configured to create status data formatted to include a plurality of regions including an event region containing pieces of event information based on a signal output from the instrument and periodically transmit the status data to the monitoring device, the pieces of event information informing the monitoring device of a change in state of the instruments; and
a first memory configured to store a first event parameter file which defines a data structure of the event region of the status data, and
when the first event parameter file is changed, and the sub-system controller creates the status data, the sub-system controller reconstructs the data structure of the event region based on the changed first event parameter file and resets the pieces of event information in accordance with the reconstructed data structure.

2. The car monitoring system according to claim 1, wherein:
the monitoring device includes
a second memory configured to store the status data received from the sub-system controller and a second event parameter file defining the data structure of the event region contained in the status data and
a monitoring device controller configured to monitor the operating state of the sub-system based on the status data; and
when the second event parameter file is changed, and the monitoring device controller monitors the operating state of the sub-system, the monitoring device controller reconstructs the data structure of the event region based on the changed second event parameter file and interprets the pieces of event information in accordance with the reconstructed data structure.

3. The car monitoring system according to claim 2, wherein:

the status data further contains pieces of signal information that is information of a signal indicating an operating state of the instrument controlled by the sub-system;
in the sub-system, the first memory further stores a first signal parameter file defining a data structure of a signal region of the status data, the signal region being a region in which the pieces of signal information are stored;
the first signal parameter file contains information specifying storage positions of the pieces of signal information in the signal region; and
when the first signal parameter file is changed, and the sub-system controller creates the status data, the sub-system controller specifies the positions of the pieces of signal information based on the information specifying the storage positions of the pieces of signal information contained in the changed first signal parameter file, reconstructs the data structure of the signal region, and resets the pieces of signal information in accordance with the reconstructed data structure.

4. The car monitoring system according to claim 2, wherein:
the status data further contains pieces of signal information that is information of a signal indicating an operating state of the instrument controlled by the sub-system;
in the monitoring device, the second memory further stores a second signal parameter file defining a data structure of a signal region of the status data, the signal region being a region in which the pieces of signal information are stored;
the second signal parameter file contains information specifying storage positions of the pieces of signal information in the signal region; and
when the second signal parameter file is changed, and the monitoring device controller monitors the operating state of the sub-system, the monitoring device controller specifies the positions of the pieces of signal information based on the information specifying the storage positions of the pieces of signal information contained in the changed second signal parameter file, reconstructs the data structure of the signal region, and interprets the pieces of signal information in accordance with the reconstructed data structure.

5. The car monitoring system according to claim 4, wherein:
the second signal parameter file contains a conversion coefficient by which each of the pieces of signal information is converted into a value used in the monitoring device; and
the monitoring device controller interprets the pieces of signal information contained in the signal region by utilizing the conversion coefficient contained in the second signal parameter file.

6. The car monitoring system according to claim 2, wherein:
each of the pieces of event information corresponds to one-bit data in the event region;
the pieces of event information are arranged in order from a first bit position in the event region; and
the monitoring device controller specifies positions of the pieces of event information based on the changed second event parameter file and reconstructs the data structure of the event region.

7. The car monitoring system according to claim 6, wherein:

the status data further contains pieces of signal information that is information of a signal indicating an operating state of the instrument controlled by the sub-system;

in the sub-system, the first memory further stores a first signal parameter file defining a data structure of a signal region of the status data, the signal region being a region in which the pieces of signal information are stored;

the first signal parameter file contains information specifying storage positions of the pieces of signal information in the signal region; and when the first signal parameter file is changed, and the sub-system controller creates the status data, the sub-system controller specifies the positions of the pieces of signal information based on the information specifying the storage positions of the pieces of signal information contained in the changed first signal parameter file, reconstructs the data structure of the signal region, and resets the pieces of signal information in accordance with the reconstructed data structure.

8. The car monitoring system according to claim 6, wherein:

the status data further contains pieces of signal information that is information of a signal indicating an operating state of the instrument controlled by the sub-system;

in the monitoring device, the second memory further stores a second signal parameter file defining a data structure of a signal region of the status data, the signal region being a region in which the pieces of signal information are stored;

the second signal parameter file contains information specifying storage positions of the pieces of signal information in the signal region; and when the second signal parameter file is changed, and the monitoring device controller monitors the operating state of the sub-system, the monitoring device controller specifies the positions of the pieces of signal information based on the information specifying the storage positions of the pieces of signal information contained in the changed second signal parameter file, reconstructs the data structure of the signal region, and interprets the pieces of signal information in accordance with the reconstructed data structure.

9. The car monitoring system according to claim 8, wherein:

the second signal parameter file contains a conversion coefficient by which each of the pieces of signal information is converted into a value used in the monitoring device; and the monitoring device controller interprets the pieces of signal information contained in the signal region by utilizing the conversion coefficient contained in the second signal parameter file.

10. The car monitoring system according to claim 1, wherein:

each of the pieces of event information corresponds to one-bit data in the event region;

the pieces of event information are arranged in order from a first bit position in the event region; and the sub-system controller specifies positions of the pieces of event information based on the changed first event parameter file and reconstructs the data structure of the event region.

11. The car monitoring system according to claim 10, wherein:

the status data further contains pieces of signal information that is information of a signal indicating an operating state of the instrument controlled by the sub-system;

in the sub-system, the first memory further stores a first signal parameter file defining a data structure of a signal region of the status data, the signal region being a region in which the pieces of signal information are stored;

the first signal parameter file contains information specifying storage positions of the pieces of signal information in the signal region; and when the first signal parameter file is changed, and the sub-system controller creates the status data, the sub-system controller specifies the positions of the pieces of signal information based on the information specifying the storage positions of the pieces of signal information contained in the changed first signal parameter file, reconstructs the data structure of the signal region, and resets the pieces of signal information in accordance with the reconstructed data structure.

12. The car monitoring system according to claim 1, wherein:

the status data further contains pieces of signal information that is information of a signal indicating an operating state of the instrument controlled by the sub-system;

in the sub-system, the first memory further stores a first signal parameter file defining a data structure of a signal region of the status data, the signal region being a region in which the pieces of signal information are stored;

the first signal parameter file contains information specifying storage positions of the pieces of signal information in the signal region; and when the first signal parameter file is changed, and the sub-system controller creates the status data, the sub-system controller specifies the positions of the pieces of signal information based on the information specifying the storage positions of the pieces of signal information contained in the changed first signal parameter file, reconstructs the data structure of the signal region, and resets the pieces of signal information in accordance with the reconstructed data structure.

13. A car monitoring system comprising:

a sub-system configured to execute a predetermined function by controlling at least one instrument mounted on a railcar; and a monitoring device configured to monitor an operating state of the sub-system, wherein:

the sub-system includes a sub-system controller configured to create status data containing pieces of event information based on a signal output from the instrument and periodically transmit the status data to the monitoring device, the pieces of event information informing the monitoring device of a change in state of the instrument; and a first memory configured to store a first event parameter file which defines a data structure of an event region of the status data, the event region being a region in which the pieces of event information are stored, the monitoring device includes a second memory configured to store the status data received from the sub-system controller and a second event parameter file defining the data structure of the event region contained in the status data; and a monitoring device controller configured to monitor the operating state of the sub-system based on the status data, when the first event parameter file is changed, and the sub-system controller creates the status data, the sub-system controller reconstructs the data structure of the event region based on the changed first event parameter file and resets the pieces of event information in accordance with the reconstructed data structure, and when the second event parameter file is changed, and the monitoring device controller monitors the operating state of the sub-system, the monitoring device controller reconstructs the data structure of the event region based on the changed second event parameter file and interprets the pieces of event information in accordance with the reconstructed data structure.

* * * * *